Feb. 9, 1943.  I. C. CLAWSON  2,310,759
DRILL WITH ADJUSTABLE HEAD
Filed Jan. 6, 1940
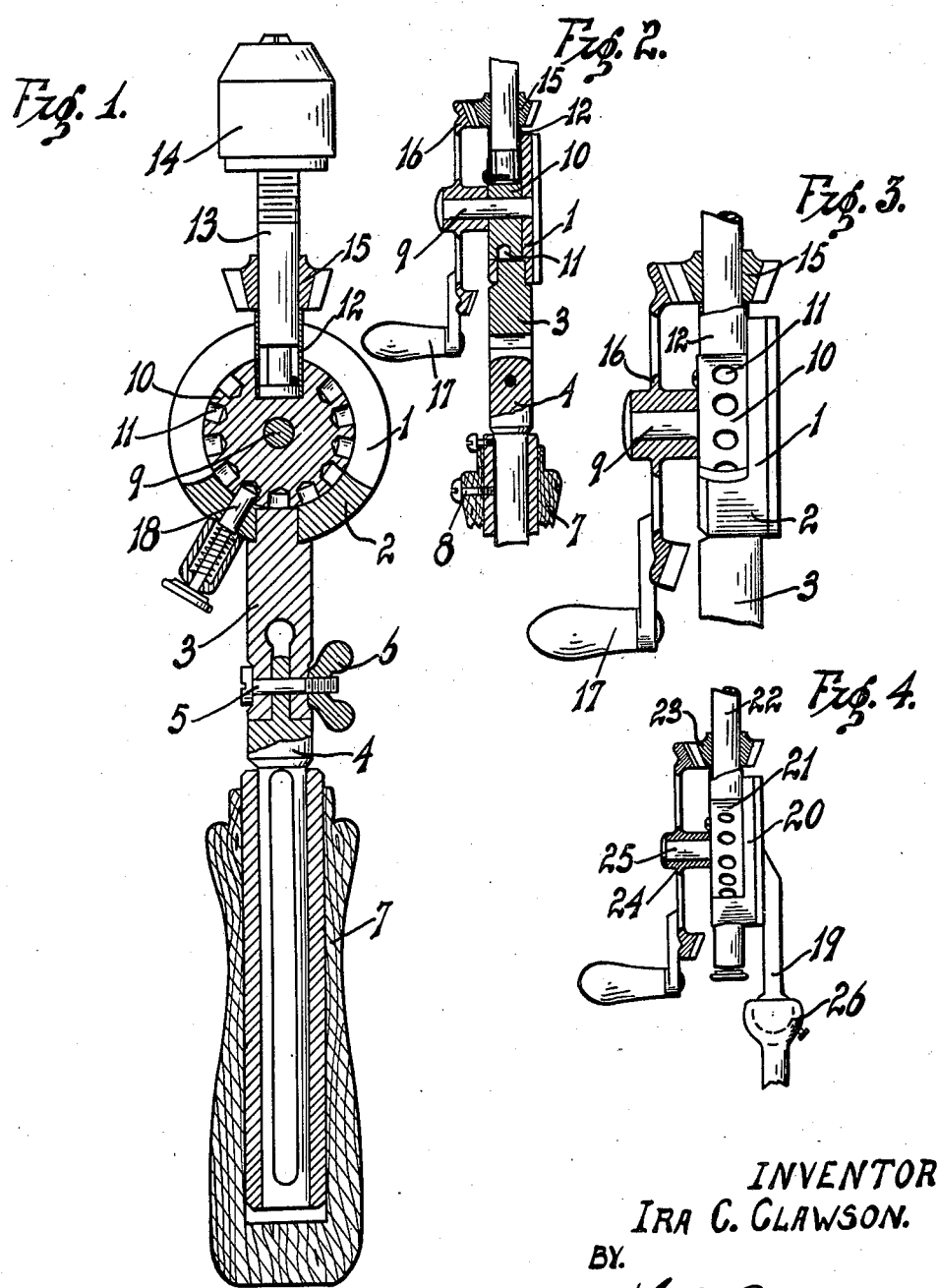
INVENTOR.
IRA C. CLAWSON.
BY
ATTORNEY.

Patented Feb. 9, 1943

2,310,759

UNITED STATES PATENT OFFICE 2,310,759

DRILL WITH ADJUSTABLE HEAD

Ira C. Clawson, Los Angeles, Calif.

Application January 6, 1940, Serial No. 312,724

3 Claims. (Cl. 77—7)

This invention relates to a drill with adjustable head whereby the drill may be positioned at an angle to the handle of the drill.

An object of my invention is to provide a novel means of adjustably mounting the chuck shaft in the hub of the drill so that the chuck shaft may be swung throughout a large angle and held in any one of a number of different positions throughout this angle.

Still another object is to provide a simple and inexpensive drill of the character stated, and also one in which the handle may be angularly adjusted relative to the hub of the drill.

A feature of my invention resides in the novel means of arranging and positioning the driving gear so that the pinion gear on the chuck shaft meshes constantly with the driving gear, and is capable of being rotated to various positions throughout a large angle.

Other objects, advantages and features of the invention may appear from the accompanying drawing, the subjoined detailed description, and the appended claims.

In the drawing:

Figure 1 is a longitudinal, sectional view of my drill.

Figure 2 is a fragmentary, longitudinal, sectional view taken at right angles to the position shown in Figure 1.

Figure 3 is a fragmentary, side elevation of my drill with parts broken away to show interior construction.

Figure 4 is a fragmentary, side elevation of a modified form of handle mounting, with parts broken away to show interior construction.

Referring more particularly to the drawing, the numeral 1 indicates the hub of the drill, on the lower portion of which an arcuate flange 2 is provided, preferably integral with the hub. A handle stud 3 is fixedly secured to the hub 1, and is preferably attached to the flange 2 of the hub. A handle stem 4 is pivotally attached to the outer end of the stud by means of a bolt 5, upon which a wing nut 6 is preferably screwed. By loosening the wing nut 6, the stem 4 can be angularly adjusted relative to the stud 3. The handle 7 is mounted on the stem 4, and is slidably mounted on this stem, preferably being held in position by means of a set screw 8, or the like. By this means, it is possible to elongate the handle of the drill, if this is desirable or necessary.

A shaft 9 is fixedly secured to the hub 1, and extends at right angles to this hub. A disk 10 is journaled on the shaft 9, and bears against the inner face of the hub 1. The disk 10 is provided with a plurality of spaced holes 11, in its periphery—that is, holes serving as adjustment stops, as will be further described. A sleeve 12 is fixedly mounted in the disk 10, and the chuck shaft 13 is mounted in this sleeve. The chuck shaft is held against longitudinal movement in the sleeve by suitable and usual means.

The usual tool chuck 14 is mounted on the outer end of the chuck shaft 13. A pinion gear 15 is fixedly secured to the chuck shaft 13, and this pinion gear meshes with the driving gear 16. The hub of the driving gear 16 is journaled on the shaft 9, and a handle 17, attached to the driving gear, enables this gear to be rotated, thus rotating the meshing pinion gear 15, and the chuck shaft 13, to which it is attached. The driving gear 16 and the disk 10 both rotate on the same axis, and consequently the pinion gear 15 will constantly mesh with the driving gear as the chuck shaft 13 is adjusted relative to the handle of the drill.

A spring pressed detent 18 extends through the flange 2 of the hub 1, and enters any one of the holes 11. Thus, the disk 10 is held in any one of a number of angularly adjusted positions. By releasing the detent 18, the disk 10, and the chuck shaft 13 mounted thereon, can be adjusted around the shaft 9 to the position desired by the workman. The detent 18 is then released and drops into one of the holes 11, thus holding the chuck shaft in its adjusted position. The workman then locates the driving gear 16 to perform the drilling operation.

In Figure 4, I have shown a slightly modified form of drill, in which the handle 19 is mounted on the outer face of the hub 20. The remaining construction of the drill is identical to that previously described—namely the disk 21, which is identical to the disk 10, the chuck shaft 22, which corresponds to the shaft 13, the gear drive consisting of pinion 23 and a driving gear 24, which is mounted on the shaft 25, secured to the hub 20.

A ball joint 26 may be provided in the handle so that the tool may be adjusted to various angular positions relative to the hub 20 of the drill.

Having described my invention, I claim:

1. An adjustable drill comprising a hub, a handle stud fixedly mounted on the periphery of the hub, the outer face of the hub having a plain surface, a handle grip adjustably mounted on the outer end of the handle stud, said adjustment being angular to the handle stud, means slidably mounting the handle grip whereby the handle may be elongated, a shaft projecting from the hub, a disk journaled on the shaft, a sleeve mounted in the disk, a chuck shaft journaled in the sleeve, a pinion mounted on the chuck shaft, a driving gear journaled on the shaft and meshing with the pinion gear, said disk having a plurality of holes in the periphery thereof, and a spring pressed detent mounted on the hub adjacent the handle and adapted to extend into any one of said holes to hold the disk in adjusted position.

2. An adjustable drill comprising a disk like hub, an arcuate flange integrally formed with the hub and projecting from the lower part of said hub, a handle attached to the flange, a shaft fixedly mounted on the hub, and projecting at right angles to said hub, a disk journalled on the shaft and arranged within the arcuate flange, a chuck shaft rotatably mounted on the disk, means to rotate said chuck shaft, a spring pressed detent mounted in the flange, said disk having spaced holes in the periphery thereof adapted to receive the detent whereby the disk is held in adjusted position.

3. An adjustable drill comprising a disk like hub, an arcuate flange integrally formed with the hub and projecting from the lower part of said hub, a handle attached to the flange, a shaft fixedly mounted on the hub, and projecting at right angles to said hub, a disk journalled on the shaft and arranged within the arcuate flange, a chuck shaft rotatably mounted on the disk, means to rotate said chuck shaft, a spring pressed detent mounted in the flange, said disk having spaced holes in the periphery thereof adapted to receive the detent whereby the disk is held in adjusted position, a handle grip adjustably mounted on the outer end of the handle, said handle grip being also longitudinally adjustable.

IRA C. CLAWSON.